United States Patent [19]

Sawae et al.

[11] Patent Number: 5,609,374
[45] Date of Patent: Mar. 11, 1997

[54] AUTOMOBILE BUMPER

[75] Inventors: Shinichi Sawae; Akihiko Koshiro; Kouiti Odaka; Teruaki Ogino, all of Saitama, Japan

[73] Assignee: Honda Giken Kogyo Kabushiki Kaisha, Japan

[21] Appl. No.: 410,108

[22] Filed: Mar. 24, 1995

Related U.S. Application Data

[62] Division of Ser. No. 145,838, Nov. 2, 1993, Pat. No. 5,423,673.

[30] Foreign Application Priority Data

| Nov. 2, 1992 | [JP] | Japan | 4-317805 |
| Nov. 6, 1992 | [JP] | Japan | 4-321397 |
| Nov. 6, 1992 | [JP] | Japan | 4-321398 |

[51] Int. Cl.$^6$ ................................. B60R 19/00
[52] U.S. Cl. .......................... 293/102; 293/120
[58] Field of Search ................... 293/102, 120

[56] References Cited

U.S. PATENT DOCUMENTS 4,208,069  6/1980  Huber et al. ..................... 293/102
4,350,378  9/1982  Wakamatsu ....................... 293/120

FOREIGN PATENT DOCUMENTS 62-119213  7/1987  Japan.
2-72916  3/1990  Japan.

*Primary Examiner*—Joseph D. Pape
*Attorney, Agent, or Firm*—Merchant, Gould, Smith, Edell, Welter & Schmidt

[57] ABSTRACT

An automobile bumper for use on an automobile body has a thicker region having a relatively large wall thickness, a gradually varying region having a gradually varying wall thickness, and a thinner region having a relatively small wall thickness. The thicker region, the gradually varying region, and the thinner region are integrally formed with each other and arranged successively downwardly when mounted on the automobile body. The gradually varying region has a wall thickness reduced at a constant rate from the wall thickness of the thicker region to the wall thickness of the thinner region in a direction from the thicker region toward the thinner region.

11 Claims, 10 Drawing Sheets

FIG.5(a)

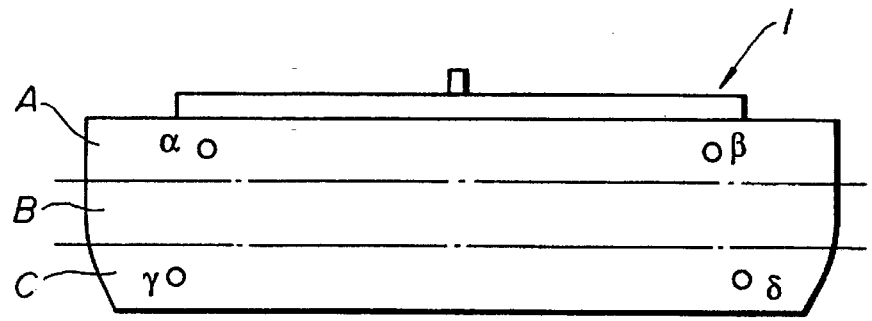

FIG.5(b)

| MOLDABLE MATERIAL | STATUS | BUMPER WITH CONSTANT WALL THICKNESS | | | | BUMPER PARTLY THINNED OUT | | | |
|---|---|---|---|---|---|---|---|---|---|
| | | SHRINKAGE FACTOR | | SHRINKAGE FACTOR DIFFERENCE | | SHRINKAGE FACTOR | | SHRINKAGE FACTOR DIFFERENCE | |
| X | BEFORE COATED | UPPER WALL | 6.6 | 1.0 | | UPPER WALL | 6.5 | −0.4 | |
| | | LOWER WALL | 7.6 | | | LOWER WALL | 6.1 | | |
| | AFTER COATED | UPPER WALL | 7.9 | 0.8 | | UPPER WALL | 7.7 | −0.3 | |
| | | LOWER WALL | 8.7 | | | LOWER WALL | 7.4 | | |
| Y | BEFORE COATED | UPPER WALL | 6.4 | 1.3 | | UPPER WALL | 6.6 | −0.5 | |
| | | LOWER WALL | 7.7 | | | LOWER WALL | 6.1 | | |
| | AFTER COATED | UPPER WALL | 7.1 | 1.0 | | UPPER WALL | 7.4 | −0.2 | |
| | | LOWER WALL | 8.1 | | | LOWER WALL | 7.2 | | |
| Z | BEFORE COATED | UPPER WALL | 7.6 | 1.4 | | UPPER WALL | 7.4 | −0.6 | |
| | | LOWER WALL | 9.0 | | | LOWER WALL | 6.8 | | |
| | AFTER COATED | UPPER WALL | 9.1 | 0.7 | | UPPER WALL | 9.3 | −0.3 | |
| | | LOWER WALL | 9.8 | | | LOWER WALL | 9.0 | | |

(X1/1000)

| RATE OF CHANGE OF WALL THICKNESS (%) \ LENGTH OF GRADUALLY VARYING REGION (mm) | 0 | 10 | 20 | 30 | 40 | 50 | 60 | 70 | 80 |
|---|---|---|---|---|---|---|---|---|---|
| 10 | X | X | X | △ | △ | O | O | O | O |
| 20 | X | X | X | X | △ | O | O | O | O |
| 30 | X | X | X | X | X | O | O | O | O |
| 35 | X | X | X | X | X | O | O | O | O |
| 40 | X | X | X | X | X | X | △ | △ | △ |
| 50 | X | X | X | X | X | X | X | X | X |
| 60 | X | X | X | X | X | X | X | X | X |

X: FAILURE    △: OCCASIONAL FAILURE    O: NO FAILURE

THICKER REGION
THINNER REGION
GRADUALLY VARYING REGION
50mm
10e
10

PRODUCT WALL THICKNESS (mm)

AUTOMOBILE BUMPER

This is a Divisional of application Ser. No. 08/145,838, filed Nov. 2, 1993, which application(s) are incorporated herein by reference now U.S. Pat. No. 5,423,673 issued Jun. 13, 1995.

BACKGROUND OF THE INVENTION

1. Field of the Invention

The present invention relates to an automobile bumper and an injection mold for forming such an automobile bumper.

2. Description of the Prior Art

Widespread use of automobiles because of their growing effectiveness in the society has aroused serious concern over environmental problems that they are posing. The automobile industry is attempting to take various measures to reduce pollutants which automobile emissions are responsible for.

One effective effort is automobile emission control that can be achieved by improved fuel economy. The fuel economy can be improved in many ways including the reduction of the weight of various automobile parts. One of such automobile parts is a bumper which may be attached to the front or rear end of an automobile.

The bumpers serve the primary purpose of protecting other functional parts of the automobiles upon collision, and also serve as a design component. If only a desired portion of a bumper is thinned out to make the bumper lighter, then the abilities of the bumper to absorb shocks and resist heat may be impaired, or the injection mold that is used to form the bumper may not be sufficiently filled (a phenomenon known as a short shot), reducing the aesthetic quality of the bumper.

It is therefore necessary to reduce the weight of a bumper while retaining its desired functions without impairing the aesthetic appearance of the bumper.

When an elongate thin-plate workpiece such as an automobile bumper or the like is injection-molded using a multipoint gate, the formed bumper tends to suffer a short shot, weld marks, and flow marks. According to one solution, which is disclosed in Japanese laid-open utility model publication No. 62-119213, for example, a film gate having a large inlet width is employed to fill a mold cavity with a resin material.

However, when a film gate is used in molding a bumper, the film gate is subsequently cut off the molded bumper and thrown away. Therefore, the film gate should be as short as possible in order to meet the requirement for a reduced quantity of resin material which is used to mold a thin, light bumper.

To make a film gate shorter, the film gate may be limited to a certain length along the longitudinal direction of a mold cavity for molding a bumper, rather than extending fully along the longitudinal direction of the mold cavity. With such an arrangement, however, the resin material may not completely be filled in the end portions of the mold cavity which are spaced from the film gate. Specifically, the central portion of the mold cavity which corresponds to the film gate can relatively easily be filled with the resin material, whereas the end portions of the mold cavity cannot sufficiently be filled with the resin material, resulting in a short shot. Filling the resin material completely in the entire mold cavity through the shorter film gate requires that the resin material be injected under higher pressure and the mold be clamped under greater forces. As a result, the injection molding machine used is necessarily required to be large in size, and the cost of the molded bumper is increased.

Efforts have been made to design in a short period of time an optimum injection mold for injection-molding a workpiece such as an automobile bumper based on a computerized simulation process for representing the behavior of a resin material in the injection mold.

Japanese laid-open patent publication No. 2-72916, for example, disclosed a simulating system for carrying out such a computerized simulation process. The disclosed simulating system comprises a mold design calculating device for automatically effecting calculations to design a mold in response to configuration data of a product to be molded, a molding analyzing device for simulating and analyzing the behavior of a resin material within the designed mold under given conditions, an input device for supplying analytic data to the molding analyzing device, an output device for displaying analytic results, and a data base connected to the mold design calculating device, the molding analyzing device, the input device, and the output device. The analytic results are outputted as numerical control data to a numerically controlled machine which produces an actual injection mold.

The configuration data to be supplied to the mold design calculating device are predetermined data. Based on the predetermined configuration data that are supplied, the mold design calculating device calculates a required injection pressure and required mold clamping forces, and also calculates an optimum gate position and an optimum number of gates which do not cause a molding failure. When the wall thickness of a workpiece such as an automobile bumper to be injection-molded is partly varied, the conventional simulating system cannot design an optimum configuration for an injection mold for forming such a workpiece by determining a wall thickness distribution that will not increase the injection pressure and the mold clamping forces and not lower the workpiece appearance quality, and that will keep the workpiece rigidity at a desired level.

More specifically, as described above, the thickness of an automobile bumper to be injection-molded may be partly thinned out if the bumper is to be made lighter. If the thinned-out portion of the bumper is not optimally designed, however, the injection pressure or the mold clamping forces will be increased, resulting in an increase in the size of an injection molding machine, or defects such as shrink marks, warpage, or the like will be caused, lowering the commercial value of the injection-molded bumper. The conventional simulating system fails to carry out an analytic process for determining an injection mold configuration based on an optimum wall thickness distribution.

To injection-mold an automobile bumper whose wall thickness is partly varied, a minimum resin pressure required to injection-mold the bumper is established with respect to a thicker portion of the bumper to prevent the thicker portion from having shrink marks. If such a minimum resin pressure is to be maintained throughout the entire mold cavity including end portions thereof, certain portions in the mold cavity which form thinner portions of the bumper are subject to an excessive resin pressure.

SUMMARY OF THE INVENTION

It is therefore an object of the present invention to provide an automobile bumper which is relatively light, maintains desired capabilities including shock absorption and heat resistance, and is aesthetically appealing to the eye.

Another object of the present invention is to provide an injection mold for forming such an automobile bumper.

According to the present invention, there is provided an automobile bumper for use on an automobile body has a thicker region having a relatively large wall thickness, a gradually varying region having a gradually varying wall thickness, and a thinner region having a relatively small wall thickness, the thicker region, the gradually varying region, and the thinner region being integrally formed with each other and arranged successively downwardly when mounted on the automobile body.

Preferably, the constant rate is 35% or less, and the gradually varying region has a length of about 50 mm or greater from the thicker region to the thinner region.

According to the present invention, there is also provided an injection mold for forming an automobile bumper having a central portion extending transversely across an automobile body at one of front and rear ends thereof, and a pair of side portions bent from respective opposite ends of the central portion and extending along respective sides of the automobile body, comprising a mold cavity for molding the automobile bumper therein, the mold cavity including a film gate extending longitudinally of the mold cavity at one side thereof, for introducing a moldable material into the mold cavity, a first cavity region having a relatively large thickness for molding a thicker region of the automobile bumper, a second cavity region having a gradually varying thickness for molding a gradually varying region of the automobile bumper, and a third cavity region having a relatively small thickness for molding a thinner region of the automobile bumper, the film gate, the first cavity region, the second cavity region, and the third cavity region being arranged successively transversely of the mold cavity.

The first cavity region, the second cavity region, and the third cavity region may extend fully longitudinally of the mold cavity. The gradually varying region in each of the side portions may extend into and be curved in the thicker region.

The film gate may be coextensive with a portion of the first cavity region which corresponds to the central portion of the automobile bumper.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 5(a) is a front elevational view of the automobile bumper, showing points where the shrinkage factor of the automobile bumper is measured when it is injection-molded;

FIG. 5(b) is a table of measured shrinkage factors;

DETAILED DESCRIPTION OF THE PREFERRED EMBODIMENTS

The principles of the present invention are particularly useful when embodied in a workpiece such as an automobile bumper to be mounted on a front or rear end of an automobile body. The automobile bumper is injection-molded of a resin material as an integral unitary body, and has different wall thicknesses for a reduced weight unlike conventional automobile bumpers with constant wall thickness.

Figure 1:
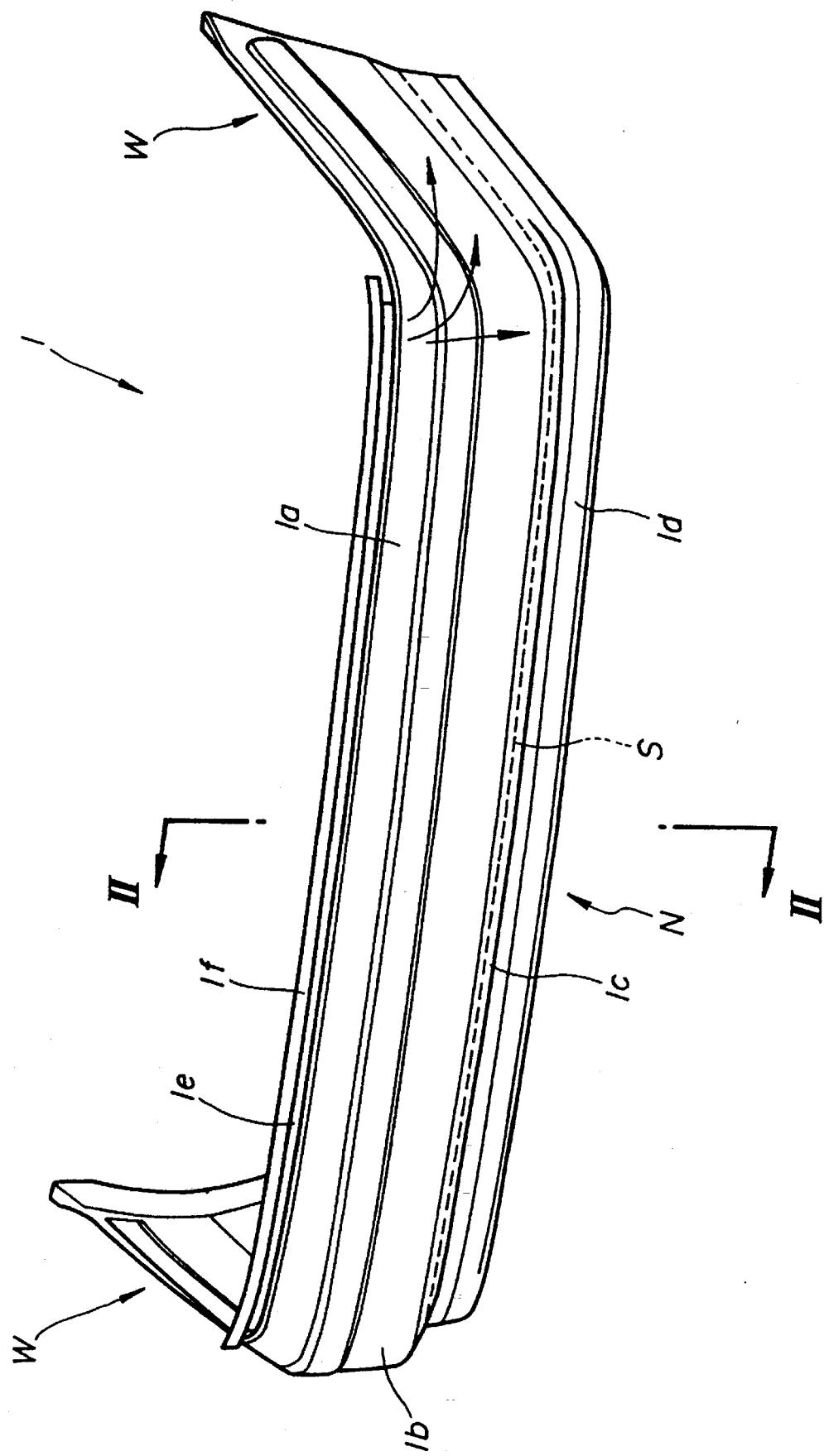
FIG. 1 is a perspective view of an automobile bumper, immediately after it is injection-molded, according to a first embodiment of the present invention.
Figure 2:
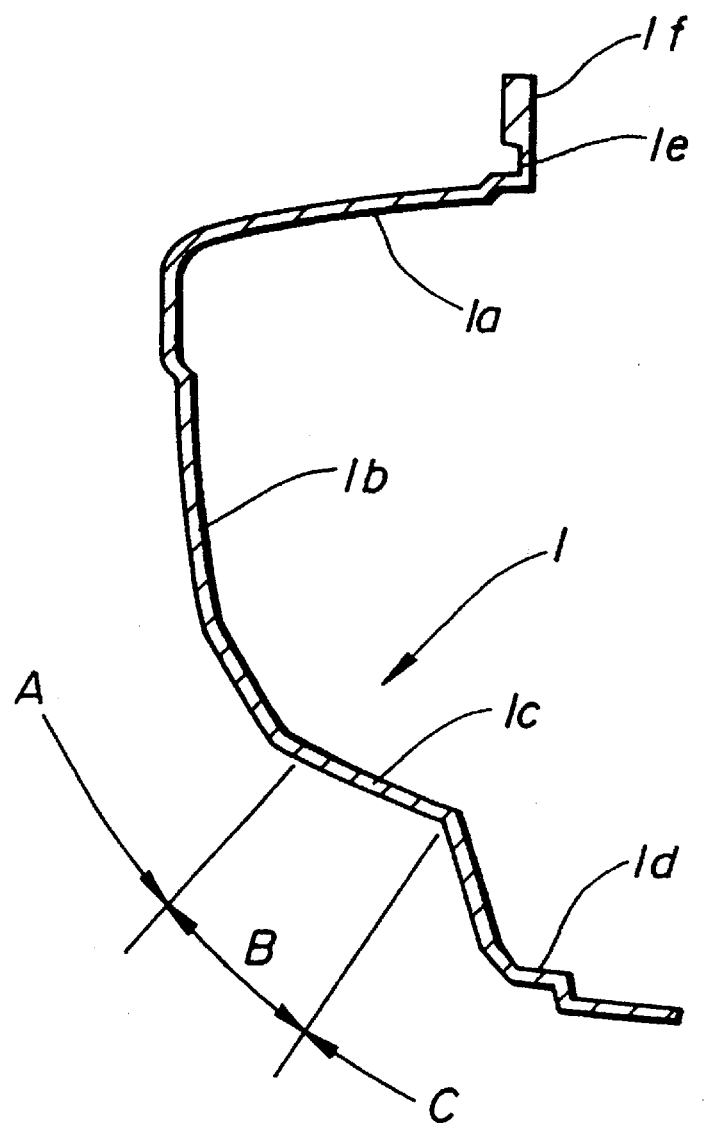
FIG. 2 is an enlarged cross-sectional view taken along line II—II of FIG. 1.

As shown in FIGS. 1 and 2, an automobile bumper according to a first embodiment of the present invention, which is generally designated by the reference numeral 1, comprises an upper wall 1a which is positioned in an upper position when the automobile bumper is mounted on an automobile, the upper wall 1a extending substantially horizontally outwardly from the automobile body, a vertical wall 1b extending downwardly from the outer end of the upper wall 1a, a lower slanted wall 1c extending from the lower end of the vertical wall 1b obliquely downwardly toward the automobile body, and a corner wall 1d extending from the lower end of the lower slanted wall 1c further downwardly and then horizontally toward the automobile body. In terms of the wall thickness, the automobile bumper 1 is composed of a thicker region A (see FIG. 2) including the upper wall 1a to the vertical wall 1b where the wall thickness is relatively large, a gradually varying region B primarily including the lower slanted wall 1c where the wall thickness gradually or linearly varies at a constant ratio, for example, and a thinner region C primarily including the corner wall 1d where the wall thickness is relatively small. The automobile bumper is injection-molded by an injection mold 2 as shown in FIG. 3.

Figure 3:
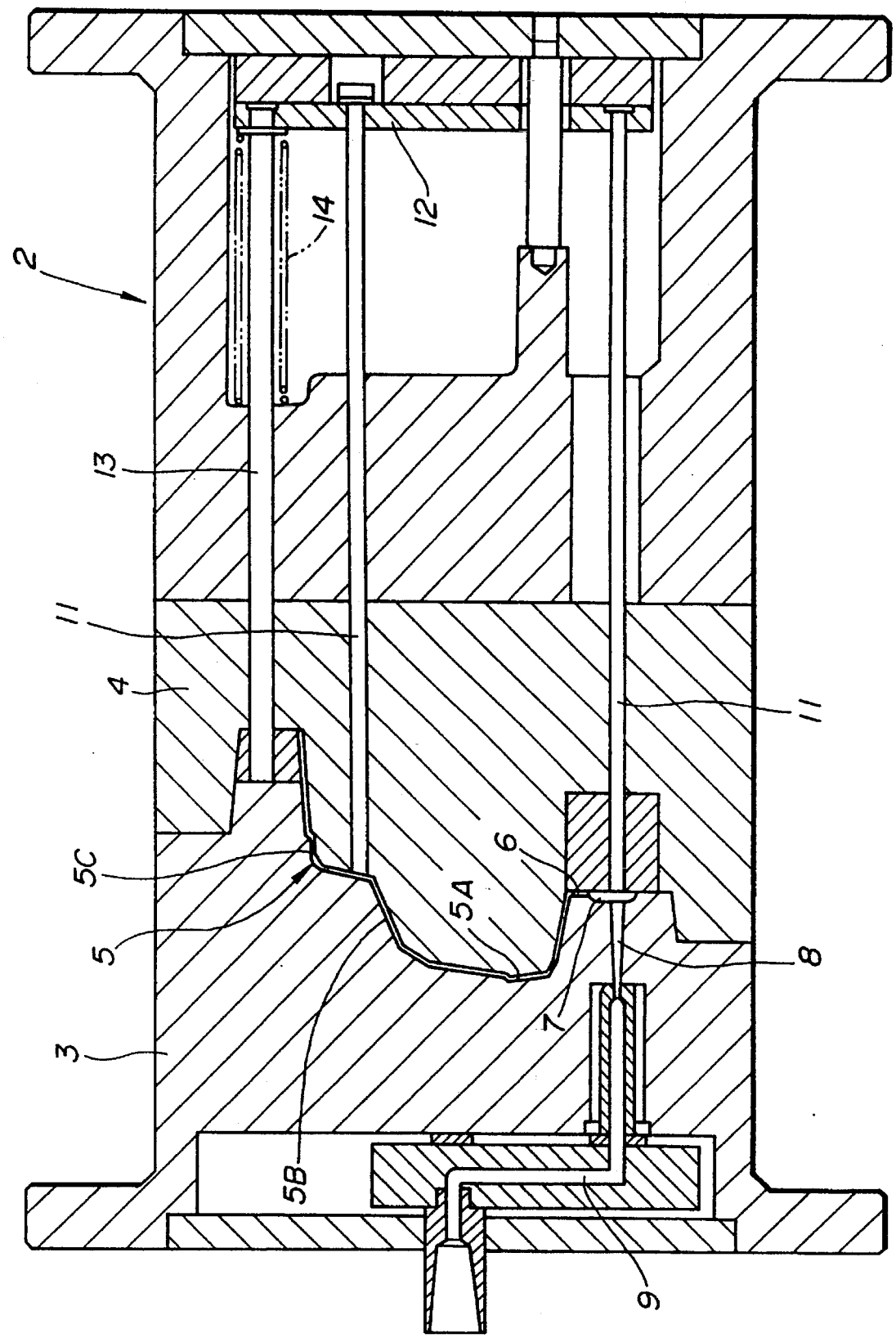
FIG. 3 is a cross-sectional view of an injection mold for forming the automobile bumper shown in FIG. 1.

As shown in FIG. 3, the injection mold 2 comprises a stationary mold member 3 and a movable mold member 4 which jointly define a mold cavity 5 between their confronting die surfaces. The mold cavity 5 is composed of a cavity region 5A corresponding to the thicker region A of the automobile bumper 1 and having a width or thickness of about 3.8 mm, a cavity region 5B corresponding to the gradually varying region B and having a width or thickness varying from 3.8 mm to 2.8 mm, and a cavity region 5C corresponding to the thinner region C and having a thickness of about 2.8 mm.

The injection mold 2 includes a thin web-like film gate 6 positioned at one side (lower side in FIG. 3) of the cavity region 5A and extending in a longitudinal direction (normal to the sheet of FIG. 3) thereof. The film gate 6 is shorter than the mold cavity 5 and extends only a certain length in the longitudinal direction thereof, i.e., corresponding to a central portion N of the automobile bumper 1 which extends transversely the automobile body at a front or rear end thereof. The film gate 6 does not extend into mold cavity portions corresponding to respective opposite side portions W of the automobile bumper 1 which are located one on each side of the central portion N and bent from the central portion N, as shown in FIG. 1. The injection mold 2 also includes a film gate runner 7 disposed adjacent to and communicating with the film gate 6, the film gate runner 7 having a slightly wider cross-sectional area than the film gate 6. The film gate runner 7 is connected at its substantially longitudinally central portion to one end of a sprue 8 which is connected at its other end to a hot runner 9.

A plurality of ejector pins 11 for pushing an injection-molded automobile bumper out of the mold cavity 5 extend through the movable mold member 4 and have respective tip ends positioned in the mold cavity 4. The other ends of the ejector pins 11 are fixed to an ejector plate 12 that is mounted in the injection mold 2 for movement toward and away from the movable mold member 4. A return pin 13 is coupled at one end thereof to the ejector plate 12, and a return spring 14 is disposed around the return pin 13 for normally urging the ejector plate 12 and hence the ejector pins 11 to move toward a home position which they assume before ejecting the injection-molded automobile bumper out of the mold cavity 5.

A moldable resin material is supplied from the hot runner 9 to the sprue 8 and then through the film gate runner 7 and the film gate 6 into the mold cavity 5 in which the resin material flows from the cavity region 5A through the cavity region 5B into the cavity region 5C and also flows from the region corresponding to the central portion N into the regions corresponding to the side portions W. After the region material fills the mold cavity 5 completely, it is solidified into the automobile bumper 1 which includes the central portion N that extends transversely across the automobile body and the side portions W bent from the opposite ends of the central portion N along lateral sides of the automobile body when the automobile bumper 1 is mounted on the automobile body.

As shown in FIG. 1, the injection-molded automobile bumper 1 includes a web-shaped film gate region 1e formed in the film gate 6 and a web-shaped film gate runner region 1f formed in the film gate runner 7. The film gate region 1e and the film gate runner region 1e are coextensive and integral with the central portion N. The film gate region 1e and the film gate runner region 1e will be cut off and discarded in a subsequent process. Since the film gate region 1e and the film gate runner region 1f do no extend along the side portions W and extend only along the central portion N, the amount of resin material that is thrown away when the film gate region 1e and the film gate runner region 1e are cut off and discarded is relatively small.

Heretofore, the upper wall 1a, the vertical wall 1b, the lower slanted wall 1c, and the corner wall 1d have had the same thickness. According to the first embodiment, however, the wall thickness of the automobile bumper 1 varies or decreases stepwise in at least three steps in the transverse direction thereof, i.e., downwardly from the upper wall 1a toward the corner wall 1d in the installed condition, and such a stepwise wall thickness gradient exists along the entire length of the automobile bumper 1.

Specifically, as described above, the upper wall 1a and the vertical wall 1b jointly make up the thicker region A whose wall thickness is of a relatively large value of about 3.8 mm. The corner wall 1d serves as the thinner region C whose wall thickness is of a relatively small value of about 2.8 mm. The intermediate lower slanted wall 1c serves as the gradually varying region B whose wall thickness gradually or linearly varies at a constant ratio, for example.

The reasons for the above wall thickness distribution will be described below.

Generally, it is preferable that an injection-molded piece be of a uniform wall thickness. Since the injected resin material keeps on shrinking while it is being cooled and solidified, if the wall thickness of the injection-molded piece were not uniform, different portions of the resin material would be solidified in different times and hence would shrink to different degrees, resulting in distortions or deformations due to shrink marks or undesirable internal stresses developed therein.

Specifically, a thicker region tends to shrink to a larger extent, and a thinner region is apt to shrink to a smaller extent. A boundary region between the thicker and thinner regions is liable to suffer deformations or defects including shrink marks, warpage, or the like.

One way of thinning out an automobile bumper for a cutdown in weight is to thin out the automobile bumper uniformly in its entirety. However, the automobile bumper which is thinned out uniformly in its entirety suffers a rigidity problem and fails to satisfy a strength requirement. The automobile bumper has to be partly thinned out in order to satisfy the strength requirement and reduce the weight without impairing the aesthetic appearance of the bumper. It is therefore necessary to determine which region of the bumper is to be thinned out and where a boundary region between thicker and thinner regions is to be positioned and what shape is to be given to such a boundary region. According to the present invention, the appearance of the automobile bumper is first taken into consideration in determining the thicker, thinner, and boundary regions.

Figure 6:
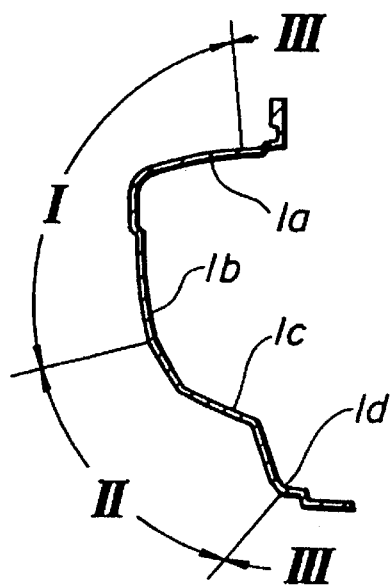
FIG. 6 is a cross-sectional view of the automobile bumper, showing appearance standards therefor by way of example.

FIG. 6 shows, by way of example, appearance standards to judge the visual prominence and decorative value of the automobile bumper as it is mounted on the automobile body. As shown in FIG. 6, the automobile bumper may be divided into three appearance zones I, II, III arranged successively downwardly in the vertical direction. After the automobile bumper is mounted on the automobile body, the appearance zone I is visually prominent and has a highest decorative value, the appearance zone II is also visually prominent but has a lower decorative value than the appearance zone I, and the appearance zone III is not visually prominent and has a lowest decorative value.

Almost the entire upper wall 1a, except its marginal edge attached to the automobile body, and an upper portion of the vertical wall 1b belong to the appearance zone I. A lower portion of the vertical wall 1b, the lower slanted wall 1c, and a front portion of the corner wall 1d belong to the appearance zone II. The marginal edge of the upper wall 1a attached to the automobile body, and a lower portion of the corner wall 1d belong to the appearance zone III.

According to this embodiment, any region where shrink marks and other defects tend to be developed due to a reduction in the wall thickness is selected not to coincide with the appearance zone I.

It is also important to select the position of the thinner region such that any shrink marks and other defects developed in that region will be minimized.

Figure 4A:
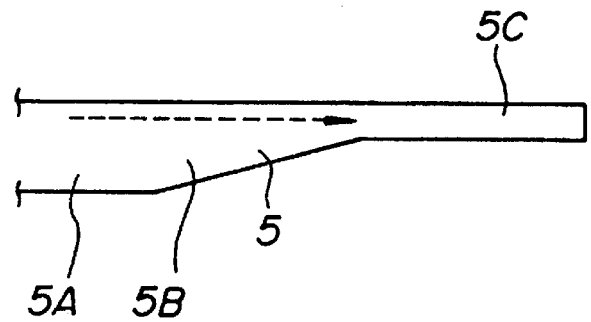
FIG. 4(a) is a schematic diagram showing a flow of a resin material in the injection mold at the time the automobile bumper is injection-molded.
Figure 4B:
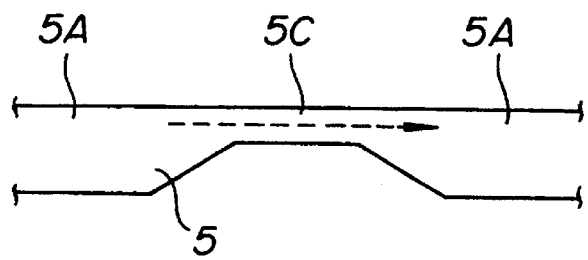
FIG. 4(b) is a schematic diagram showing a flow of a resin material for comparison with the flow shown in FIG. 4(a)

More specifically, if the cavity region 5C were positioned in an intermediate area along the flow (indicated by the broken-line arrow) of a resin material in the mold cavity 5, as shown in FIG. 4(b), then the resin pressure is subjected to a large loss by the cavity region 5C, causing shrink marks or other defects to occur in a portion of the cavity region 5A that is positioned downstream of the cavity region 5C.

According to the present invention, such irregularities can be avoided by positioning the cavity region 5C most downstream along the flow (indicated by the broken-line arrow) of a resin material in the mold cavity 5, as shown in FIG. 4(a), and also by linearly varying the configuration of the cavity region 5B. When the resin material is introduced from the cavity region 5A through the cavity region 5B into the cavity region 5C, the resin material is free of the problem with the arrangement shown in FIG. 4(b), namely, the failure of the resin material to closely adhere to the mold surfaces of the cavity region 5A due to the pressure loss caused by the cavity region 5C positioned as shown in FIG. 4(b).

When the resin material is introduced into the mold cavity 5 from the film gate 6, the resin material smoothly flows from the cavity region 5A through the cavity region 5B into the cavity region 5C within the mold cavity portion which is coextensive with the film gate 6. At this time, the resin material flows primarily in a direction transverse to the longitudinal direction of the mold cavity 5, i.e., the automobile bumper 1. In the mold cavity portions which are not coextensive with the film gate 6, however, it is necessary for the resin material to flow in the longitudinal direction of the mold cavity 5 in order to fill the ends of the mold cavity 5. If the resin material were prevented from flowing in the longitudinal direction of the mold cavity 5, then the region material would fail to fill the ends of the mold cavity 5.

In this embodiment, the cavity region 5A, the cavity region 5B, and the cavity region 5C continuously extend fully along the longitudinal direction of the mold cavity 5, and a central line of the cavity region 5B which has a constant width linearly extends from one end to the other as indicated by the broken line S in FIG. 1. Thus, the resin material that is introduced into the mold cavity 5 from the opposite ends of the film gate 6 flows as indicated by the arrows in FIG. 1 and fills up the mold cavity 5 smoothly up to the opposite ends thereof. Since the cavity region 5C is located most downstream along the flow of the resin material, as described above with reference to FIG. 4(a), the failure of the resin material to fill the mold cavity 5 completely, as is the case with the arrangement shown in FIG. 4(b), is avoided.

When the resin material is introduced from the film gate 6 into the mold cavity 5 up to its ends, the resin pressure near the film gate 6 is higher and becomes progressively reduced as it flows away from the film gate 6. If the resin pressure is to be of a required molding pressure in cavity regions remote from the film gate 6, then the resin pressure near the film gate 6 is excessively high. According to this embodiment, it is not necessary to increase the injection pressure and the mold clamping forces as confirmed by experimentation.

More specifically, the mold cavity 5 is of such a structure that any unwanted excessive resin pressure developed in the vicinity of the film gate 6 is utilized to force the resin material into the ends of the mold cavity 5 which are remote from the film gate 6.

In this embodiment, the gradually varying region B or the cavity region 5B has a length of about 50 mm or more, and a thickness linearly varying from about 3.8 mm, which is the thickness of the thicker region A of the cavity region 5A, to about 2.8 mm, which is the thickness of the thinner region C or the cavity region 5C. The rate of change of the thickness of the gradually varying region B or the cavity region 5B is 35 % or less. The rate of change of the thickness is represented by $(a/c-1) \times 100\%$ where a is the wall thickness of the thicker region A and c is the wall thickness of the thinner region C.

Figures 7, 9:
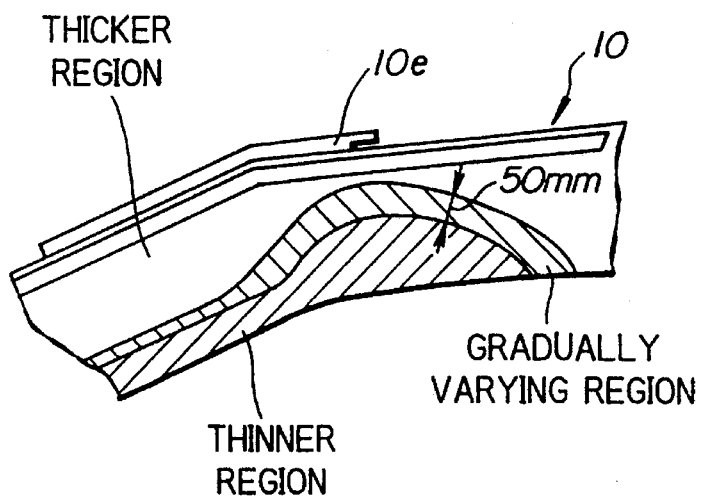
FIG. 7 is a table of data indicative of whether an injection-molded automobile bumper is defective or not in various combinations of different lengths of a gradually varying portion of the automobile bumper and different rates of change of the wall thickness thereof.
FIG. 9 is a fragmentary view illustrative of the wall thickness of the automobile bumper shown in FIG. 8 in the vicinity of an end of a film gate.

FIG. 7 shows data indicative of whether the injection-molded automobile bumper is defective or not in various combinations of different lengths of the gradually varying portion B and different rates of change of the wall thickness thereof. It can be seen from FIG. 7 that no defect or deformation is produced if the rate of change of the wall thickness of the gradually varying region B is 35% or less and the length of the gradually varying region B is 50 mm or more. If the rate of change of the wall thickness of the gradually varying region B were in excess of 35%, then the bumper would have a molding failure even when the length of the gradually varying region B is 80 mm. If the length of the gradually varying region B were less than 50 mm, then the bumper would also suffer a molding failure even when the rate of change of the wall thickness of the gradually varying region B is of a small value of 10%, for example.

According to the present embodiment, on the condition that the experimental data shown in FIG. 7 are satisfied, the gradually varying region B where shrink marks or other deficiencies are likely to occur is composed of the lower slanted wall 1c which is less prominent in the appearance zone II, and the thinner region C is composed of the corner wall 1d.

It has been found out that the automobile bumper of the above structure offers the following secondary advantages:

When the molding pressure in the mold cavity 5 is insufficient, it becomes impossible for the resin material to reach every corner of the mold cavity 5, resulting in defects or deformations in the injection-molded bumper. It is known that any shrinkage of the injection-molded bumper is reduced if the molding pressure is increased.

The molding pressure in the mold cavity 5 is progressively lowered as the distance from the film gate 6 is larger. With the automobile bumper 1, the molding pressure is higher on the upper wall 1a, and lower on the corner wall 1d, so that their shrinkage factors would be greatly different from each other. Since the corner wall 1d makes up the thinner region C, however, its shrinkage factor is reduced, canceling out the disadvantages caused by the reduced molding pressure and the reduced wall thickness. It has been confirmed that the difference between the shrinkage factors of the upper and corner walls 1a, 1d is reduced as shown in FIG. 5(b).

More specifically, as shown in FIG. 5(a), the upper portion, i.e., the thicker region A, of the bumper 1, and the lower portion, i.e., the thinner region C, thereof are marked with the ejector pins at spaced points α-β, λ-δ, and the injection mold is similarly marked. The distances between these points on the injection-molded bumper 1 and the injection mold were measured, and the shrinkage factors were calculated based on the measured distances. It can be understood from FIG. 5 (b) that the differences between the shrinkage factors of bumpers injection-molded of resin materials X, Y, Z are smaller than those of bumpers having constant wall thicknesses.

Consequently, the bumper structure according to this embodiment is also effective to reduce any deformations developed when the bumper is injection-molded.

As described above, the mold cavity 5 for injection-molding the automobile bumper 1 shown in FIG. 1 is composed of the cavity region 5C located most downstream along the flow of the resin material, the cavity region 5A located upstream along the flow of the resin material, and the cavity region 5B disposed between the cavity regions 5A, 5C. The automobile bumper 1 injected-molded in the mold cavity 5 has a gradually varying wall thickness. Any excessive resin pressure developed in the vicinity of the film gate 6 is utilized to fill the resin material in up to the ends of the mold cavity 5, for thereby minimizing defects such as shrink marks, warpage, or other deformations which are developed due to different shrinkage factors when the injection-molded automobile bumper 1 is solidified. The automobile bumper 1 thus injection-molded is relatively light and still maintains its desired functions. Even if defects are developed in the gradually varying region B formed in the cavity region 5B, such defects are not prominent as the gradually varying region B is positioned beneath the vertical wall 1b, and the commercial value of the automobile bumper 1 is now lowered. The automobile bumper 1 is a material saver because the amount of resin material used to mold the lightweight automobile bumper 1 is reduced.

An automobile bumper according to a second embodiment of the present invention and an injection mold for forming the automobile bumper will be described below.

Figure 8:
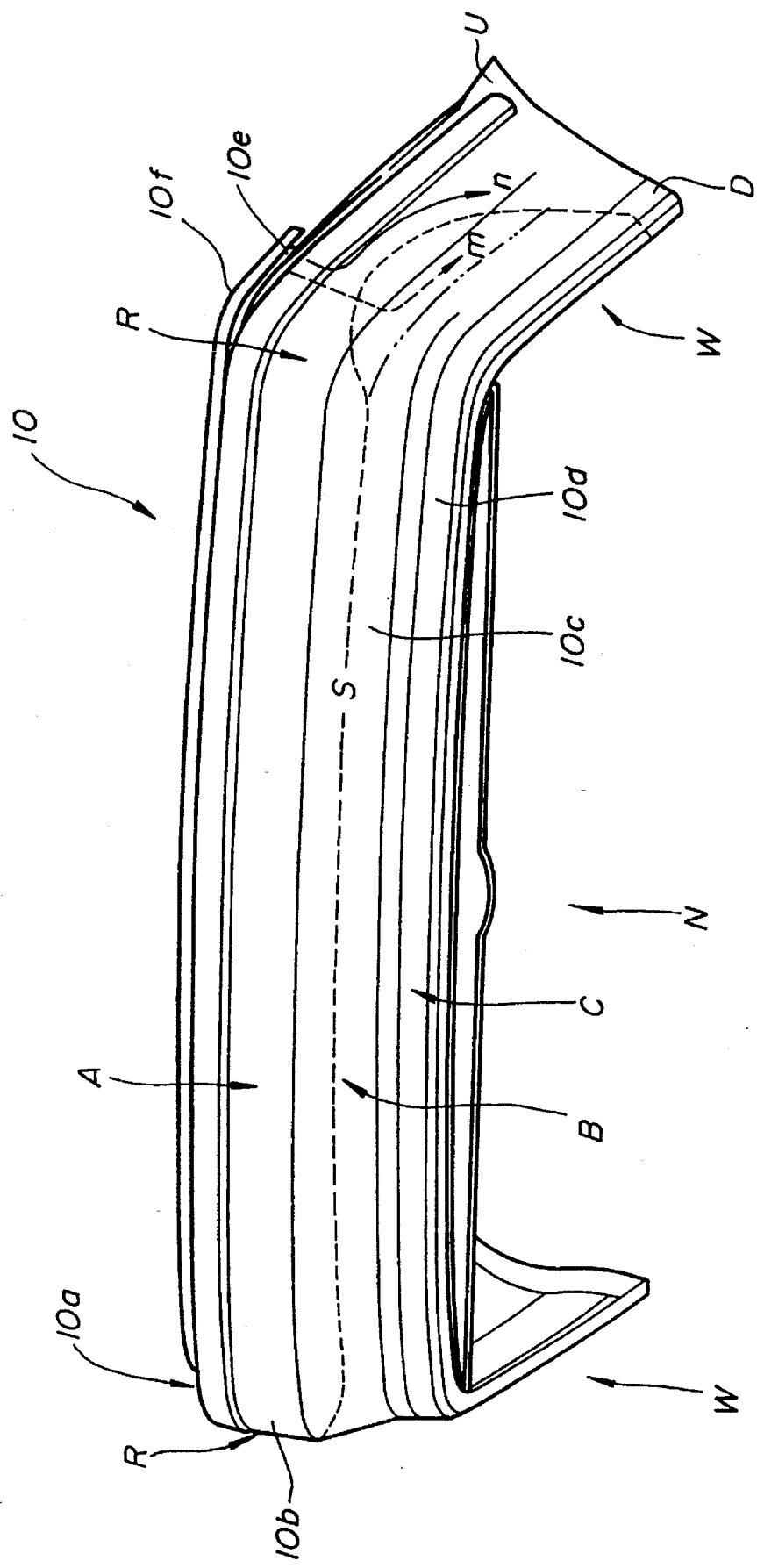
FIG. 8 is a perspective view of an automobile bumper, immediately after it is injection-molded, according to a second embodiment of the present invention.

FIG. 8 shows an automobile bumper 10 according to the second embodiment. The automobile bumper 10 has a wall thickness which varies or decreases stepwise in at least three steps in the transverse direction thereof, as with the automobile bumper 1 according to the first embodiment.

As shown in FIG. 8, the automobile bumper 10 comprises an upper wall 10a and a vertical wall 10b which jointly make up a thicker region A having a wall thickness of about 3.8 mm, a corner wall 10d serving as a thinner region C having a wall thickness of about 2.8 mm, and a lower slanted wall 10c serving as a gradually varying region B having a wall thickness that varies at a constant rate, for example.

The automobile bumper 10 according to the second embodiment differs from the automobile bumper 1 according to the first embodiment in that the automobile bumper 10 has a web-shaped film gate region 10e and a web-shaped film gate runner region 10f which are bent in respective bent corners R of the bumper 10 and slightly extend along the side portions W of the bumper 10, and that portions of the gradually varying region B which correspond to the respective ends of the film gate region 10e extend partly into the thicker region A closely to the film gate region 10e or its ends. The gradually varying region B has a central line, indicated by a broken line S in FIG. 8, which curves convexly in the vicinity of the ends of the film gate region 10e. The thicker region A is located above the central line S and the thinner region B below the central line S.

An injection mold for forming the automobile bumper 10 according to the second embodiment is substantially the same as the injection mold 2 (see FIG. 3) for forming the automobile bumper 1 according to the first embodiment, except for modifications required to achieve the above differences. More specifically, the film gate 6 and the film gate runner 7 shown in FIG. 3 extend slightly over those portions of the mold cavity 5 which form the side portions W of the bumper in order to have the film gate region 10e and the film gate runner region 10f bent in the respective bent corners R of the bumper 10 and slightly extending along the side portions W of the bumper 10, and the portions of the cavity region 5B which correspond to the respective ends of the film gate 6 are positioned closely to the film gate 6 or curved into the thicker region 5A.

As shown in FIG. 9, the length of the gradually varying portion B in the vicinity of the ends of the film gate region 10e is about 50 mm, and the rate of change of the wall thickness of the gradually varying portion B is about 35% or less.

A process of filling a resin material in a conventional mold cavity with a constant thickness from a film gate of a limited length was simulated. As a result of such a simulation, it has been found out that the resin pressure was excessive in the vicinity of the ends of the film gate and low in the ends of the mold cavity, and hence the excessive resin pressure was not utilized.

In the mold cavity for injection-molding the automobile bumper 10 according to the second embodiment, the resin material introduced from the ends of the film gate 6 is resisted by the cavity region 5B, and tends to flow toward the ends of the mold cavity 5 as indicated by the arrow n in FIG. 8. Therefore, the resin material can be filled in the mold cavity 5 smoothly up to the ends thereof under the conventional injection pressure. More specifically, as shown in FIG. 8, the resin material ingressing from the ends of the film gate region 10e (the film gate 6) is smoothly filled up to the ends of the wide portions W of the bumper 10, i.e., the rear ends of the bumper 10 in the longitudinal direction of the automobile, across the vertical interval between upper and lower corners U, D. The resin material is filled in the mold cavity under substantially the same resin pressure which is applied to the ends of the side portions W across the vertical interval thereof and the end of the central portion N opposite to the film gate region 10e, i.e., corresponding to the thinner region C.

If the boundary between the thicker region A and the gradually varying region B extended linearly as indicated by the two-dot-and-dash line in FIG. 8, then the resin material introduced from the film gate 6 would flow downwardly and then horizontally as indicated by the arrow m. Since the resin material would flow over a longer path, its pressure would drop, possibly failing to fill the resin material smoothly up to the ends of the mold cavity 5 (the ends of the bumper 1).

The above mold structure was tested to measure the resin pressure in the mold cavity 5, deformations of the molding with a surface strain gage, and molding cycles. It has been confirmed based on the measured data that it was possible to fill the resin material in the mold cavity up to the thinner region C under substantially the same pressure as the pressure used when a bumper of a constant thickness is molded, and that any defects or deformations occurred at the same level as those of a bumper of a constant thickness.

In the injection mold for forming the automobile bumper according to the second embodiment, the film gate relatively short, and the cavity region B has portions positioned closely to the ends of the film gate to allow the resin material to flow smoothly so that the ends of the mold cavities can simultaneously be filled with the resin material. The injection pressure and the mold clamping forces are not required to be increased, and hence the injection molding machine used is not increased in size. Since the molded bumper is partly thinned out and the film gate has a limited length, the resin material is reduced in quantity and the molded bumper is reduced in weight.

The resin material smoothly is introduced from the cavity region corresponding to the thicker region A through the cavity region corresponding to the gradually varying region B into the cavity region corresponding to the thinner region C within the mold cavity portion which is coextensive with the film gate. Since the thickness of the cavity region corresponding to the gradually varying region B is gradually varied, defects such as shrink marks, warpage, deformations, etc. which are caused due to different shrinkage factors when the resin material is solidified are less liable to occur. The cavity region corresponding to the thicker region A, the cavity region corresponding to the gradually varying region B, and the cavity region corresponding to the thinner region C are successively arranged transversely across the mold cavity for forming the thicker region A, gradually varying region B, and the thinner region C, respectively, as web-like members extending in the longitudinal direction of the bumper. The injection-molded bumper is thus kept at a desired level of rigidity.

The resin pressure in the mold cavity is higher near the film gate and lower away from the film gate. If the resin pressure is to be of a required molding pressure in cavity regions remote from the film gate, then the resin pressure near the film gate has to be higher than actually required. According to the second embodiment, the unwanted excessive resin pressure developed in the vicinity of the film gate is utilized to accelerate the filling of the resin material into the ends of the mold cavity which are remote from the film gate. Specifically, the cavity region for forming the gradually varying region B near the ends of the film gate is positioned closely to the film gate to permit the resin material to flow through the cavity regions corresponding respectively to the thicker and gradually varying regions A, B smoothly toward the ends of the mold cavity. The resin material can thus be filled in the mold cavity under a relatively low pressure as a whole without wasting an excessive pressure.

A process of manufacturing an injection mold for forming the automobile bumpers according to the first and second embodiments, e.g., an automobile bumper 100 (see FIG. 12) which is partly thinned out, while keeping minimum resin pressures required to form bumper regions of different wall thicknesses will be described below.

Figure 12:
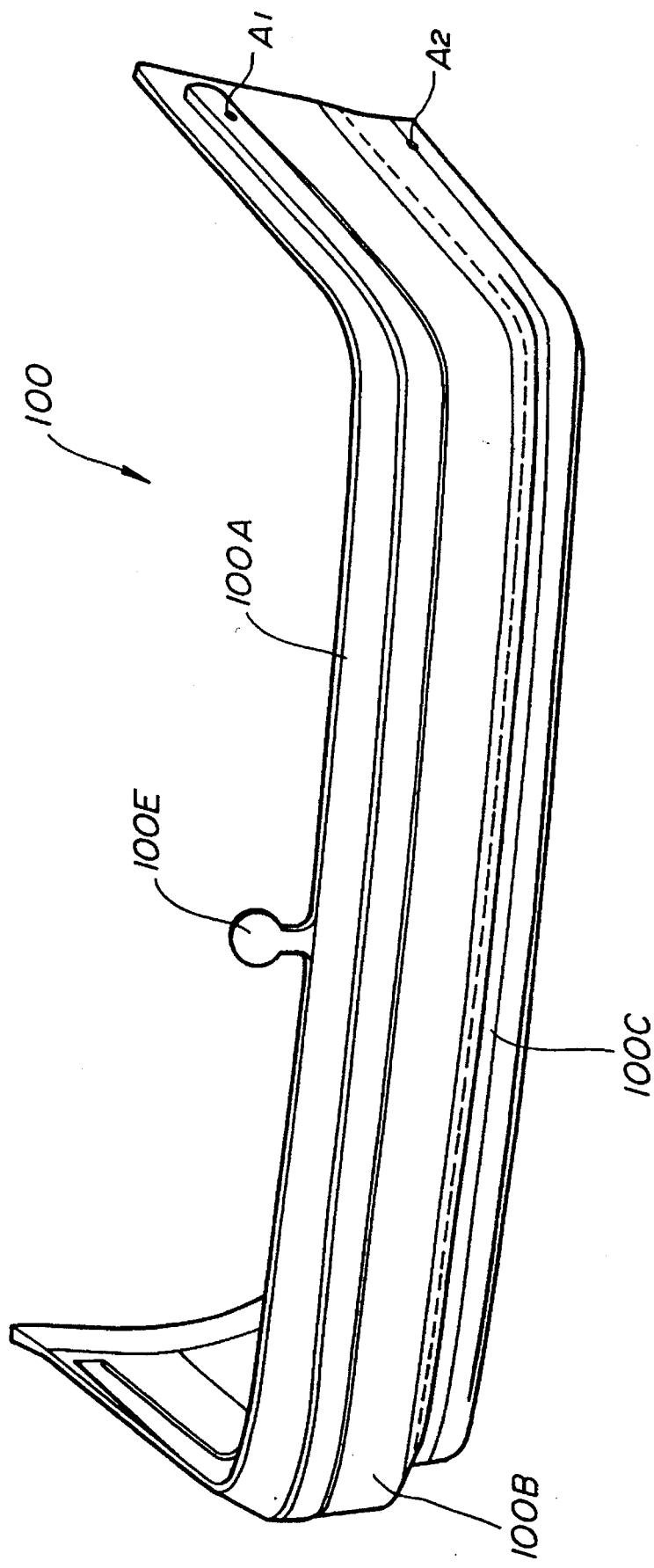
FIG. 12 is a perspective view of an automobile bumper as an example of the workpiece.

As shown in FIG. 12, the automobile bumper 100 comprises an upper wall 100A, an intermediate wall 100B, and a lower wall 100C which are arranged successively in the transverse direction thereof. A resin material from which the automobile bumper 100 is to be injection-molded is introduced from a gate region 100E at the center of the upper end of the upper wall 100A.

The gate region 100E that is integrally formed with the automobile bumper 100 will subsequently be cut off.

Heretofore, the automobile bumper 100 has been of a constant thickness of about 4 mm, for example. According to the present invention, the automobile bumper 100 is partly thinned out for a weight cutdown. The resin material is filled under a most economical pressure not to develop defects or deformations such as shrink marks or warpage and also not to lower the rigidity of the bumper.

As described above, the resin pressure is generally higher upstream and lower downstream in the flow of the filling resin material. Therefore, if the automobile bumper 100 were of a constant wall thickness, then the resin pressure in the lower wall 100C remote from the gate region 100E would be lower than the resin pressure in the upper wall 100A close to the gate region 100E. If the resin pressure in the lower wall 100C were a minimum pressure required, then the resin pressure in the upper wall 100A would be excessively higher than the minimum pressure.

If the automobile bumper 100 has regions of different wall thicknesses, then defects such as shrink marks or the like tend to develop unless a higher resin pressure is applied to form a region of a greater wall thickness.

If the lower wall 100C where the resin pressure is lower is thinned out, then shrink marks or other defects are minimized and the weight of the bumper 100 is also reduced, and the bumper 100 can be injection-molded under the same resin pressure as that which is applied when an automobile bumper of a constant wall thickness is injection-molded. However, it is necessary to determine an optimum range where the automobile bumper is to be thinned out.

According to the present invention, an optimum wall thickness distribution is determined according to a procedure described below, and outputted as numerical control data for machining the injection mold.

First, minimum resin pressures (kgf/cm$^2$) that are required to injection-mold the bumper 100 without developing shrink marks and other deformations are determined for different wall thicknesses (mm) based on experimentation.

Figure 11:
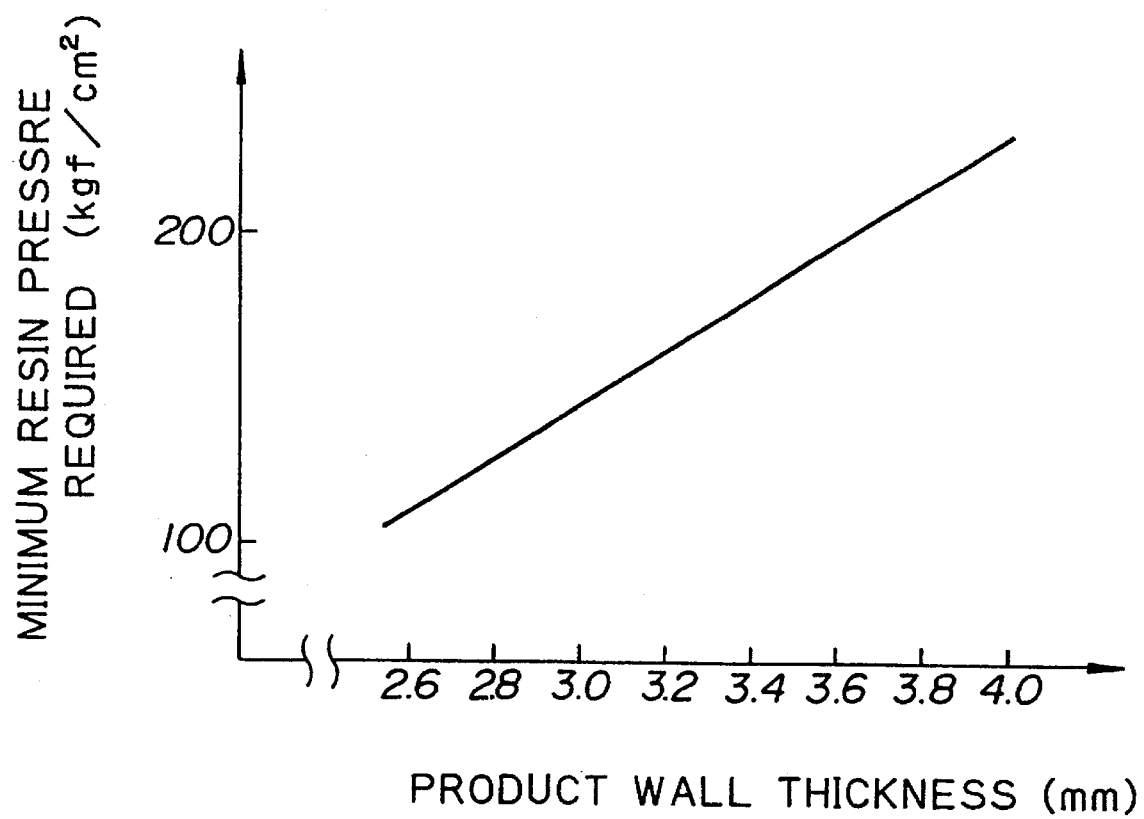
FIG. 11 is a graph showing the relationship between the wall thickness of the workpiece and a minimum resin pressure that is required to injection-mold the workpiece.

Since defects such as shrink marks are more likely to occur in the thicker region than in the thinner region, as described above, the minimum resin pressure that is required, which is represented on the vertical axis of the graph shown in FIG. 11, becomes higher as the wall thickness, which is represented on the horizontal axis of the graph, increases.

Figure 10:
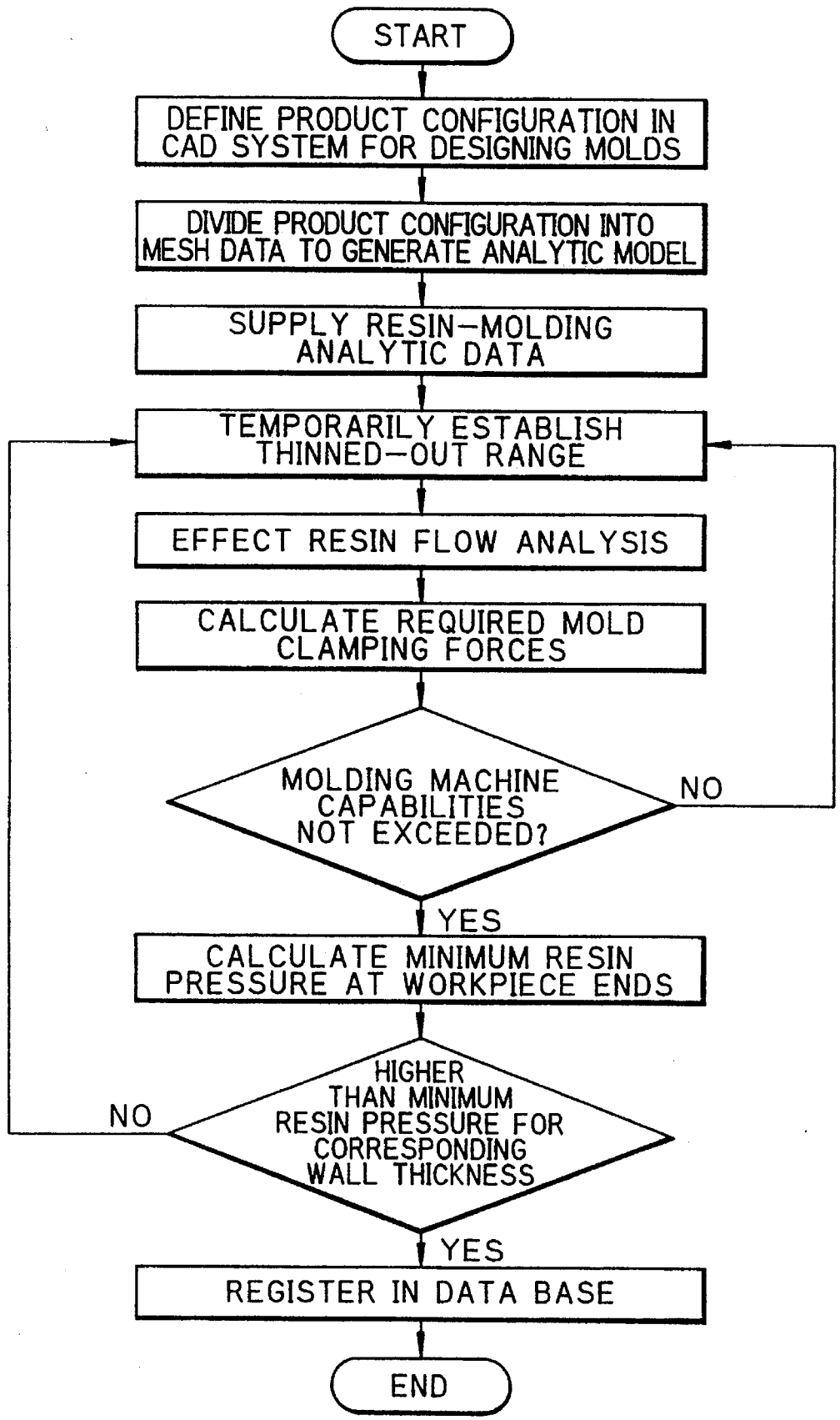
FIG. 10 is a flowchart of a process of producing an injection mold for molding a workpiece such as an automobile bumper.

Then, as shown in the flowchart of FIG. 10, configuration data of the bumper, except wall thickness data, are supplied to a CAD system for designing molds, and the bumper configuration is divided into mesh data to generate an analytic model according to the finite element method.

The CAD system is supplied with resin-molding analytic data representing the type of a resin material, the properties of the resin material, the temperature of an injection mold, the position of a gate, the shape of the gate, and the injection pressure.

Thereafter, a range where the bumper is to be partly thinned out is temporarily established, and a resin flow analysis is carried out.

More specifically, the upper wall 100A near the gate region 100E is selected as a thicker region of a predetermined thickness, and the lower wall 100C as a thinner region, and their ranges are temporarily established. Under the established wall thickness conditions, a resin pressure distribution and required mold clamping forces are determined, and it is confirmed whether the resin pressure at mold cavity ends satisfies minimum resin pressures required depending on the wall thicknesses.

If the resin pressure at mold cavity ends satisfies the minimum resin pressures, then the range where the bumper is to be thinned out is corrected, and the resin flow analysis is repeated until the resin pressure at mold cavity ends satisfies the minimum resin pressures.

One example of the resin flow analysis will be described below.

It is assumed that the automobile bumper 100 shown in FIG. 12 has a wall thickness of 4 mm at a position $A_1$ and a wall thickness of 3 mm at a position $A_2$. If the minimum resin pressure required for achieving a wall thickness of 4 mm is 240 kg/cm² and the minimum resin pressure required for achieving a wall thickness of 3 mm is 150 kg/cm² in FIG. 11, then a filling failure occurs at the position $A_2$ when the resin pressure is 240 kg/cm² at the position $A_1$ and 80 kg/cm² at the position $A_2$. Since the bumper 100 has a large surface strain in the position $A_2$, the injection molding machine would be inappropriate for molding the bumper 100.

Consequently, it is necessary to increase the resin pressure up to 150 kg/cm² at the position $A_2$ by reducing the range where the bumper 100 is to be thinned out, within the capabilities of the injection molding machine.

When the resin pressure is 240 kg/cm² at the position $A_1$ and 22 kg/cm² at the position $A_2$ under the same conditions, it is necessary to increase the range where the bumper 100 is to be thinned out for a further weight reduction.

By thus approaching ideal conditions within the capabilities of the injection molding machine, it is possible to determine a wall thickness distribution for a maximum weight reduction while improving the quality of the bumper.

The optimum wall thickness distribution thus obtained is then registered as mold machining data in a data base, and will be outputted as NC data to a CAM system.

An actual injection mold is then machined by the CAM system based on the NC data.

In FIG. 12, the bumper 100 includes a thicker region in the upper wall 100A, a thinner region in the lower wall 100C, and a gradually varying region in the intermediate wall 100B between the thicker and thinner regions, so that the wall thickness gradually decreases from the thicker region to the thinner region.

The gradually varying region is provided between the thicker and thinner regions because if the wall thickness varied abruptly stepwise, then the difference between the shrinkage factors of the thicker and thinner regions would be so large that large stresses would be developed in the boundary therebetween, tending to cause defects including warpage, deformation, etc.

The resin flow analysis for satisfying a minimum resin pressure required for each of the wall thicknesses permits an automobile bumper to have a smaller weight than when a resin flow analysis is effected based on a single minimum resin pressure required irrespective of different wall thicknesses.

In FIG. 12, the position $A_2$ on the bumper 100 which is remotest from the gate region 100E is located at a bumper end. However, a bumper end may be determined depending on the bumper configuration or the position of the gate.

Since the process of manufacturing an injection mold according to the present invention effects the resin flow analysis based on the minimum resin pressures corresponding to the respective wall thicknesses, the process is effective particularly for reducing the weight of a bumper while keeping the resin pressure constant, and can easily determine a wall thickness distribution which does not lead to a molding failure.

The present invention offers various advantages. For example, capabilities of the injection molding machine are effectively utilized, and any excessive resin pressure is also effectively utilized. Injection-molded automobile bumpers are relatively light, and manufactured less costly because of a reduced amount of resin material used.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An automobile bumper for use on an automobile body, comprising:

a thicker region having a relatively large wall thickness at a top portion of said bumper;

a thinner region having a relatively small wall thickness at a bottom portion of said bumper; and a gradually varying region formed integrally between said thicker region and said thinner region to slope downwardly and inwardly towards the automobile, said gradually varying region having a wall thickness reduced from a wall thickness of said thicker region to a wall thickness of said thinner region in a direction from said thicker region toward said thinner region, the reduction in wall thickness being 35% or less where the reduction in wall thickness is defined to be $100\times((c/a)-1)\%$, c being the wall thickness of said thinner region and a being the wall thickness of said thicker region, and wherein said gradually varying region has a length of about 50 mm or greater from said thicker region to said thinner region.

2. An automobile bumper according to claim 1, comprising:

an upper wall extending substantially horizontally;

a vertical wall joined to said upper wall; and a lower slanted wall joined to and extending downwardly from said vertical wall;

said gradually varying region being disposed downwardly of said vertical wall.

3. An automobile bumper according to claim 2, further comprising a corner wall, said upper wall extending substantially horizontally outwardly from the automobile body, said vertical wall extending downwardly from said upper wall, said lower slanted wall being bent from a lower end of said vertical wall obliquely downwardly toward the automobile body, said corner wall extending downwardly from said lower slanted wall and bent toward the automobile body.

4. An automobile bumper according to claim 1, comprising a central portion extending transversely across the automobile body at one of front and rear ends thereof, and a pair of side portions bent from respective opposite ends of said central portion and extending along respective sides of the automobile body, wherein said thicker region, said gradually varying region, and said thinner region extend fully longitudinally of the automobile bumper.

5. An automobile bumper according to claim 1, comprising a central portion extending transversely across the automobile body at one of front and rear ends thereof, and a pair of side portions bent from respective opposite ends of said central portion and extending along respective sides of the automobile body, wherein said gradually varying region in each of said side portions extends into said thicker region and is curved convexly upwardly.

6. An automobile bumper according to claim 1, wherein said wall thickness of said thicker region is of about 3.8 mm, said length of said gradually varying region is of about 50 mm, and said wall thickness of said thinner region is of about 2.8 mm.

7. An automobile bumper for use on an automobile body, comprising:

a thicker region having a relatively large wall thickness;

a gradually varying region having a gradually varying wall thickness;

a thinner region having a relatively small wall thickness, said thicker region, said gradually varying region, and said thinner region being integrally formed with each other and arranged successively downwardly when mounted on the automobile body;

a central portion extending transversely across the automobile body at one of front and rear ends thereof, said central portion including said thicker, gradually varying and thinner regions; and a pair of side portions bent from respective opposite ends of said central portion and extending along respective sides of the automobile body, said side portions each including said thicker, gradually varying and thinner regions wherein said gradually varying region in each of said side portions extends into said thicker region and is curved convexly upwardly.

8. An automobile bumper according to claim 7, wherein said gradually varying region has a wall thickness reduced from the wall thickness of said thicker region to the wall thickness of said thinner region in a direction from said thicker region toward said thinner region.

9. An automobile bumper according to claim 8, wherein the reduction in wall thickness is 35% or less, where the reduction in wall thickness is defined to be $100\times((c/a)-1)\%$, c being the wall thickness of said thinner region and a being the wall thickness of said thicker region.

10. An automobile bumper according to claim 9, wherein said gradually varying region has a length of about 50 mm or greater from said thicker region to said thinner region.

11. An automobile bumper according to claim 10, wherein said wall thickness of said thicker region is of about 3.8 mm, said length of said gradually varying region is of about 50 mm, and said wall thickness of said thinner region is of about 2.8 mm.

\* \* \* \* \*